United States Patent
Haubennestel et al.

(10) Patent No.: US 6,710,127 B2
(45) Date of Patent: Mar. 23, 2004

(54) LEVELLING AGENTS FOR SURFACE COATINGS

(75) Inventors: Karlheinz Haubennestel, Wesel (DE); Alfred Bubat, Wesel (DE); Albert Frank, Xanten (DE)

(73) Assignee: BYK- Chemie GmbH (DE)

( * ) Notice: Subject to any disclaimer, the term of this patent is extended or adjusted under 35 U.S.C. 154(b) by 0 days.

(21) Appl. No.: 09/967,499

(22) Filed: Sep. 28, 2001

(65) Prior Publication Data

US 2002/0143087 A1 Oct. 3, 2002

(30) Foreign Application Priority Data

Sep. 29, 2000 (DE) .......................... 100 48 258

(51) Int. Cl.$^7$ .................. C08L 79/00; C08L 33/02; C08L 51/00; C08J 3/00
(52) U.S. Cl. ................ 525/64; 525/66; 525/103; 525/127; 525/145; 525/148; 525/178; 524/379; 524/504; 524/520; 524/522; 524/523; 524/564
(58) Field of Search ................ 525/64, 66, 103, 525/127, 145, 148, 178, 119; 524/379, 504, 520, 522, 523, 564

(56) References Cited

U.S. PATENT DOCUMENTS

| | | | | |
|---|---|---|---|---|
| 5,735,944 | A | 4/1998 | Haubennestel et al. | 106/272 |
| 5,770,646 | A * | 6/1998 | Antonelli et al. | 524/512 |
| 5,840,813 | A | 11/1998 | Gornowicz et al. | 525/479 |
| 6,037,404 | A | 3/2000 | Dahm et al. | 524/590 |
| 6,174,953 | B1 * | 1/2001 | Huybrecgts | 525/66 |

FOREIGN PATENT DOCUMENTS

| | | | |
|---|---|---|---|
| DE | 3751581 | 12/1995 | ............ C08F/2/38 |
| DE | 19522475 | 9/1996 | ............ C09D/5/46 |
| EP | 0732346 | 9/1996 | ......... C08F/290/04 |
| EP | 0877765 | 9/2000 | ......... C08F/290/04 |
| WO | 88/04304 | 6/1988 | ............ C08F/2/38 |
| WO | 95/12568 | 5/1995 | ......... C07C/69/604 |
| WO | 97/13792 | 4/1997 | ............ C08F/2/38 |
| WO | 97/28200 | 8/1997 | ......... C08F/290/04 |

OTHER PUBLICATIONS

Ito, K., "Polymeric Design by Macromonomer Technique", *Prog. Polym. Sci.*, 23, pp. 581–620, (1998).

\* cited by examiner

*Primary Examiner*—James J. Seidleck
*Assistant Examiner*—Olga Asinovsky
(74) *Attorney, Agent, or Firm*—Schwegman, Lundberg, Woessner & Kluth, P.A.

(57) ABSTRACT

The invention relates to levelling agents for surface coatings having a weight-average molecular weight of from 5000 to 100,000. The levelling agent is a branched polymer comprising a free-radically or ionically polymerized base molecule into which macromonomeric units containing at one end a monomeric unit which has an ethylenically unsaturated bond and possessing a weight-average molecular weight of from 1000 to 30,000 have been incorporated by free-radical or ionic copolymerization, the weight fraction of the macromonomeric units, based on the total weight of the branched polymer, being from 1 to 60% by weight. The invention further relates to the use of appropriate polymers as levelling agents for coating formulations and to coating formulations comprising the levelling agents of the invention.

18 Claims, No Drawings

LEVELLING AGENTS FOR SURFACE COATINGS

RELATED APPLICATION

This application claims priority under 35 USC 119 from German Application No. 100 48 258.9, filed Sep. 29, 2000, which application is incorporated herein by reference.

The invention relates to levelling agents for surface coatings having a weight-average molecular weight of from 5000 to 100,000 which are suitable for giving coating compositions, such as paints, a uniform surface. The invention further relates to the use of the levelling agents of the invention for coating formulations and to coating formulations comprising the levelling agents of the invention.

Paint surfaces are normally not entirely smooth but instead have a more or less structured surface referred to as waviness or else as orange peel. These surfaces may be finely structured, with a short wave, or coarsely structured, with a long wave. In the majority of cases, this waviness is unwanted. The structure depends on the nature and composition of the coating compositions; for example, on whether these coating compositions comprise solvents or else are solvent-free, as in the case of powder coating materials. In the case of powder coating materials it is absolutely necessary to add levelling agents, since without these levelling agents it is impossible to achieve a surface which is in any way smooth.

It is known that poly(meth)acrylates and polysiloxanes may be used as levelling promoters for coatings. In the case of the polysiloxanes the compounds concerned generally comprise polydimethylsiloxanes, polymethylalkylsiloxanes, or else polyether- or polyester-modified polydimethyl- or polymethylalkylsiloxanes.

In the case of the poly(meth)acrylates, preference is given to the use of polymers or copolymers of alkyl acrylates having an alkyl radical chain length of $C_2$–$C_8$, such as ethyl acrylate, 2-ethylhexyl acrylate or n-butyl acrylate, for example. The products used possess in some cases molecular weights of up to 100,000.

These poly(meth)acrylate (co)polymers used as levelling promoters may be used as such or as solutions in organic solvents, or else as powders applied to silica, for example. This is normally the case particularly when they are used in powder coating materials. The amounts of such products that are used are usually from 0.1 to 2% by weight, based on the coating formulations.

The action of all these products is based on surface activity at the liquid/gas interface: owing to a certain incompatibility with the actual binder of the coating system, these products adopt an orientation to the interface. This incompatibility may be increased by raising the molecular weight of these polymers. A disadvantage then, however, is that owing to this incompatibility there may be a certain haze of the coating and the viscosity of the levelling agent becomes so high that handling for the user becomes very difficult if not impossible.

The existing polymers provide only an inadequate solution to the levelling problem in the case of coatings, and there is an urgent need for new levelling promoters which make it possible to produce absolutely smooth coating films, which is of utmost importance in the case of powder coatings in particular.

Surprisingly it has been found that this objective can be achieved by adding branched polymers comprising a free-radically or ionically polymerized base molecule into which monoethylenically unsaturated macromonomeric units have been incorporated by copolymerization as levelling agents to the surface coatings.

The copolymerization of these monomers, which are very different in their molecular weight, produces highly branched polymers which despite a high overall molecular weight have a much smaller base molecule chain length, owing to the macromolecular side chains. Furthermore, block structures with different compatibilities can be obtained by appropriately selecting the monomers for the base molecule and the monomers of the macromonomer; this cannot be done by free-radical copolymerization of low molecular weight monomers.

The invention accordingly provides levelling agents of the type specified at the outset which are characterized in that the levelling agent is a branched polymer comprising a free-radically or ionically polymerized base molecule into which macromonomeric units containing at one end a monomeric unit which has an ethylenically unsaturated bond and possessing a weight-average molecular weight of from 1000 to 30,000 have been incorporated by free-radical or ionic copolymerization, the weight fraction of the macromonomeric units, based on the total weight of the branched polymer, being from 1 to 60% by weight.

Advantageous embodiments of the levelling agent of the invention are evident from the dependent claims.

Graft copolymers with a comb-like structure, comprising a main chain and copolymerized macromonomer side chains, are known per se. They are used, for example, as pigment dispersants and in that case contain groups in the molecule that have affinity for the pigment. By way of example, amine-functional polymers having a macromonomer component are described in EP-A-732 346. The requirements imposed on dispersants, however, are entirely different to those imposed on levelling agents. It was therefore not obvious to use graft copolymers with a comb-like structure as levelling agents.

In order to prepare the levelling agents of the invention, monoethylenically unsaturated monomers are copolymerized with monoethylenically unsaturated macromonomers having molecular weights (MW) of from 1000 to 30,000, preferably from 5000 to 10,000, by known processes, preferably free-radically or ionically.

Preferred free-radically or ionically polymerized monomeric units of the base molecule are selected from the group consisting of alkenes and arylalkenes having from 2 to 30 carbon atoms, alkyl acrylates and alkyl methacrylates of straight-chain, branched or cyclo-aliphatic alcohols having from 1 to 22 carbon atoms, aralkyl acrylates and aralkyl methacrylates of aralkyl alcohols having from 8 to 18 carbon atoms, acrylamides and methacrylamides of straight-chain, branched or cycloaliphatic amines having from 1 to 22 carbon atoms, aminoalkyl acrylates and aminoalkyl methacrylates of straight-chain, branched or cycloaliphatic amino alcohols having from 2 to 8 carbon atoms, maleates, itaconates and fumarates of straight-chain, branched or cycloaliphatic alcohols having from 1 to 22 carbon atoms, and vinyl esters, vinyl ethers and vinyl ketones having from 3 to 20 carbon atoms.

As monomeric units of the base molecule it is also possible to use monomeric units containing polyethylene glycol, in order to allow the branched polymers of the invention to be soluble in water or emulsifiable in water. Examples of polyethylene glycol-containing monomeric units that can be used include polyethylene glycol monoacrylates or polyethylene glycol monomethacrylates having from 5 to 80 carbon atoms.

It is also possible to use monomeric units containing functional groups, in order to allow later incorporation into the respective polymeric matrix or the binder. Examples of monomeric units with functional groups that can be used include acrylic acid, methacrylic acid, and hydroxyalkyl acrylates or hydroxyalkyl methacrylates of straight-chain, branched or cycloaliphatic diols having from 2 to 36 carbon atoms. In order to permit crosslinking of the hydroxy-functional levelling agents of the invention with, for example, acrylic melamine-formaldehyde resins, it is also possible to react some or all of these hydroxyl groups with isocyanates to give secondary carbamate groups, so that during the crosslinking of the system as a whole the levelling agent is left with sufficient time to orient itself at the interface, to develop its action there, and, after a certain delay, to react with the melamine-formaldehyde resin.

In order greatly to reduce the surface tension of the branched polymers of the invention, it is advantageous to copolymerize small amounts of monomeric units having perfluoroalkyl groups. As monomeric units of perfluoroalkyl groups it is possible, for example, to use perfluoroalkyl acrylates or perfluoroalkyl methacrylates having from 6 to 20 carbon atoms.

The incorporation of polyesters in the form of caprolactone- and/or valerolactone-modified monomeric units into the polymeric base molecule is also possible. Preference is given to using caprolactone- and/or valerolactone-modified hydroxyalkyl acrylates and caprolactone- and/or valerolactone-modified hydroxyalkyl methacrylates having an average molecular weight of from 220 to 1200, the hydroxyalkyl acrylates and the hydroxyalkyl methacrylates being derived preferably from straight-chain, branched or cycloaliphatic diols having from 2 to 8 carbon atoms.

Very particularly preferred monomeric units of the base molecule are selected from the group consisting of acrylic acid, methacrylic acid, methyl acrylate, methyl methacrylate, ethyl acrylate, ethyl methacrylate, n-butyl acrylate, n-butyl methacrylate, i-butyl acrylate, i-butyl methacrylate, t-butyl acrylate, t-butyl methacrylate, lauryl acrylate, lauryl methacrylate, 2-ethylhexyl acrylate, 2-ethylhexyl methacrylate, stearyl acrylate, stearyl methacrylate, behenyl acrylate, behenyl methacrylate, cyclohexyl acrylate, cyclohexyl methacrylate, isobornyl acrylate, isobornyl methacrylate, hydroxyethyl acrylate, hydroxyethyl methacrylate, styrene, α-methylstyrene, acrylonitrile, triethylene glycol monoacrylate, triethylene glycol monomethacrylate, ethyl vinyl ether, butyl vinyl ether, cyclohexyl vinyl ether, vinyl acetate, N,N-dimethylaminoethyl acrylate, N,N-dimethylaminoethyl methacrylate, N,N-dimethylaminopropyl acrylate, N,N-dimethylaminopropyl methacrylate, polyethylene glycol monoacrylate, polyethylene glycol monomethacrylate, and also caprolactone- and/or valerolactone-modified hydroxyethyl acrylate and caprolactone- and/or valerolactone-modified hydroxyethyl methacrylate having a molecular weight of between 220 and 1200.

The abovementioned ethylenically unsaturated monomers may be polymerized individually or in combination to give the base molecule, depending on the desired binder compatibility.

As macromonomeric units, polymers formed by free-radical or ionic addition polymerization may be used. Compounds suitable for preparing these macromonomers include preferably alkenes and arylalkenes having from 2 to 30 carbon atoms, alkyl acrylates and alkyl methacrylates of straight-chain, branched or cycloaliphatic alcohols having from 1 to 22 carbon atoms, aralkyl acrylates and aralkyl methacrylates of aralkyl alcohols having from 8 to 18 carbon atoms, polyethylene glycol monoacrylates or polyethylene glycol monomethacrylates having from 5 to 80 carbon atoms, hydroxyalkyl acrylates and hydroxyalkyl methacrylates of straight-chain, branched or cyclo-aliphatic diols having from 2 to 36 carbon atoms, and vinyl esters, vinyl ethers and vinyl ketones having from 3 to 20 carbon atoms. In order drastically to reduce the surface tension of the branched polymers, it is further advantageous to copolymerize perfluoroalkyl acrylates and perfluoroalkyl methacrylates having from 6 to 20 carbon atoms into the macromonomeric units.

Particularly preferred monomeric units for preparing the macromonomeric units by free-radical or ionic addition polymerization are selected from the group consisting of ethyl acrylate, ethyl methacrylate, n-butyl acrylate, n-butyl methacrylate, i-butyl acrylate, i-butyl methacrylate, t-butyl acrylate, t-butyl methacrylate, lauryl acrylate, lauryl methacrylate, stearyl acrylate, stearyl methacrylate, 2-ethylhexyl acrylate, 2-ethylhexyl methacrylate, behenyl acrylate, behenyl methacrylate, cyclohexyl acrylate, cyclohexyl methacrylate, isobornyl acrylate, isobornyl methacrylate, hydroxyethyl acrylate, hydroxyethyl methacrylate, styrene, α-methylstyrene, acrylonitrile, triethylene glycol monoacrylate, triethylene glycol monomethacrylate, ethyl vinyl ether, butyl vinyl ether, cyclohexyl vinyl ether and vinyl acetate.

The abovementioned ethylenically unsaturated monomers may be polymerized individually or in combination to give the macromonomeric unit, depending on the desired binder compatibility.

In order to ensure that these macromonomers carry only a single ethylenically unsaturated end group, special synthesis techniques are required. On the one hand, they can be prepared using what are known as chain transfer agents, as described in U.S. Pat. No. 5,770,646. Cobalt complexes in concentrations of from 5 to 1000 ppm are used for this purpose. Preference is given, for example, to pentacyanocobaltate(II) or diaquabis(borodifluorodimethylphenylglyoximato)cobaltate(II). The corresponding Co(III) complexes are equally used. The addition polymerization is then conducted in solvents such as aromatics, ketones, acetates, alcohols or glycol ethers, for example. The free-radical initiators used are the peroxo and/or azo initiators known to the skilled worker. On the other hand, these macromonomers may be prepared by free-radical addition polymerization in the presence of a mercapto-functional carboxylic acid chain regulator, such as mercaptoacetic acid or mercaptopropionic acid, for example. This terminal carboxyl function is reacted further with glycidyl methacrylate to give the methacryloyl-functional, polymerizable macromonomer. Hydroxy-functional chain regulators, such as mercaptoethanol or mercaptopropanol, for example, are also suitable. These polymers then carry a hydroxyl function at one end, which is reacted in accordance with known processes to give the (meth)acryloyl-functional polymerizable macromonomer. The preparation of such macromonomers is described in various patents, such as WO 95/12568, WO 97/13792 and DE-A-37 51 581, for example.

Further preparation options for macromonomers are cited in the review article by Koichi Ito with the title *Polymeric Design by Macromonomer Technique* from Prog. Polym. Sci., Vol. 23, 581 ff., 1998.

In addition to the macromonomeric units obtainable by free-radical or ionic addition polymerization it is also possible to prepare the branched polymers using other macromonomers, such as monoethylenically unsaturated polydimethylsiloxanes, for example, which are obtained from monohydroxy-functional polysiloxanes by reacting them, for example, with (meth)acryloyl chloride or allyl chloride or by esterifying them with (meth)acrylic acid.

Another method of preparing such macromonomers is described in the U.S. Pat. No. 5,840,813, in accordance with which, for example, a terminally silanol-blocked polydimethylsiloxane is reacted with acryloyloxypropyldimethylchlorosilane or methacryloyloxypropyldimethylchlorosilane in the presence of dibutylamine. The products then are likewise acryloyl- or methacryloyl-functional dimethylpolysiloxanes.

The monoethylenically unsaturated macromonomeric units used to prepare the levelling agents of the invention preferably have at one end a structure selected from the structures

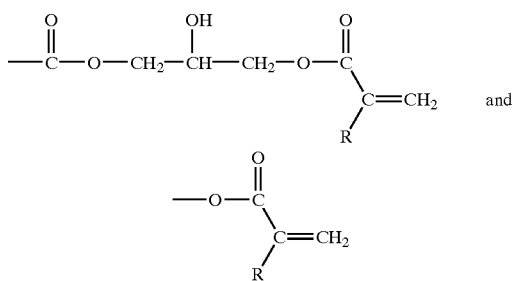

and in which the radical R corresponds to a hydrogen atom or a methyl group.

The levelling agents of the invention are prepared in a way the skilled worker knows, by means for example of free-radical addition polymerization in organic solvents or in bulk using peroxides or azo compounds as free-radical initiators. Examples of suitable solvents include esters such as ethyl acetate, n-butyl acetate or 1-methoxy-2-propyl acetate and also aromatic solvents, such as toluene or xylene, and ketones, such as methyl isobutyl ketone or methyl ethyl ketone. The choice of solvent is guided by the later intended use of the copolymer of the invention. It is preferred to use low-boiling solvents, in order to make it easier to remove these solvents by distillation in the case of applications where the 100% polymers are to be used, as in powder coating materials, for example. Suitable initiators include peroxides such as tert-butyl peroxobenzoate or dibenzoyl peroxide, for example. It is, however, also possible to use azo compounds such as azoisobutyronitrile (AIBN), for example. Preferably, peroxides are used. The addition polymerization is conducted at temperatures from about 40° C. to 180° C., preferably from 100° C. to 150° C., with particular preference from 110° C. to 130° C.

The branched polymers of the invention may also be prepared by other techniques of free-radical addition polymerization, such as Atom Transfer Radical Polymerization (ATRP) or Reversible Addition Fragmentation Chain Transfer (RAFT). Also possible is the preparation of these compounds by ionic addition polymerization, for example by addition polymerization initiated with organometallic compounds, or by Group Transfer Polymerization (GTP).

The abovementioned monomers are advantageously copolymerized with an ethylenically unsaturated macromonomer or with mixtures of two or more macromonomers in an amount of from 1 to 60% by weight, preferably from 2 to 30% by weight, with very particular preference from 2 to 15% by weight of macromonomer, based on the base molecule.

The molecular weights of the branched polymers of the invention are situated in the range from 5000 to 100,000, preferably from 10,000 to 75,000, with particular preference from 15,000 to 50,000.

The branched polymers may also be subsequently modified by means of polymer-analogous reaction. For example, a reactive double bond and acid function may be incorporated by reacting a branched polymer containing hydroxy-functional monomeric units in its base molecule with maleic anhydride. Further particular anhydrides for introducing the acid function are, for example, succinic anhydride and phthalic anhydride; in this context, hydroxy-functional monomeric units within a branched polymer may also be esterified with structurally different anhydrides. For better solubility in water, the acid function may be converted to its salt form using alkanolamines, for example. Moreover, by subsequent acrylation and/or methacrylation at the hydroxyl group, it is possible to obtain products which can be incorporated securely into coating systems even in the case of radiation cure processes, such as UV and electron beam curing.

The levelling agents of the invention are used in the coating formulations in relatively small amounts of from 0.01 to 5% by weight, preferably from 0.05 to 2% by weight, with very particular preference from 0.01 to 1% by weight.

The levelling agents of the invention may be used as solutions, emulsions or 100% substances, depending on the nature and mode of application of the coating material.

In solvent-borne coating materials it is preferred to use levelling agents which are dissolved in solvents similar to those in which the coating materials themselves are dissolved. In radiation-curing systems, the levelling agents are preferably dissolved in corresponding monomers. In powder coating materials, preference is given to a 100% version of the levelling agent or to the said levelling agents in a form in which they have been applied to pulverulent carrier material. Moreover, these levelling agents may be incorporated into wax melts in accordance with the German patent application DE-A-195 22 475 and so converted into free-flowing solid forms, if the levelling agents of the invention are viscous, tacky resins. In aqueous powder slurries, a modification of the powder coating, the levelling agents may be added in the form of an aqueous emulsion. In accordance with the prior art, these emulsions are prepared with the aid of emulsifiers.

The invention also relates to the use of branched polymers having a weight-average molecular weight of from 5000 to 100,000 and comprising a free-radically or ionically polymerized base molecule into which macromonomeric units containing at one end a monomeric unit which has an ethylenically unsaturated bond and possessing a weight-average molecular weight of from 1000 to 30,000 have been incorporated by free-radical or ionic copolymerization, the weight fraction of the macromonomeric units, based on the total weight of the branched polymer, being from 1 to 60% by weight, as levelling agents for coating formulations.

The invention additionally relates to coating formulations which contain the levelling agent of the invention in a concentration of from 0.01 to 5% by weight, preferably from 0.05 to 2% by weight, with particular preference from 0.1 to 1% by weight.

PREPARATION EXAMPLES

The invention is illustrated by the following examples. In the case of molecularly non-uniform substances, the stated molecular weights (abbreviated below to MW) represent average values of the weight average. Unless stated otherwise, parts and percentages are always by weight.

A) Preparation Examples for the Macromonomers
Preparation of a poly(isobutyl acrylate-benzyl methacrylate) macromonomer (Macromonomer 1):

86.5 g of n-butyl acetate are charged to a flask with reflux condenser, thermometer, stirrer, gas inlet pipe and dropping funnel and are brought to boiling under a nitrogen atmosphere. Under reflux, a mixture of 66.7 g of isobutyl acrylate, 13.3 g of benzyl methacrylate, 4.5 g of mercaptopropionic acid as chain regulator and 2 g of tert-butyl peroxobenzoate as polymerization initiator is metered in over the course of three hours. After the end of the addition, reaction is carried out for two hours more. The result is a polymer having a terminal carboxyl function. The reaction mixture is cooled to 90° C. and 200 ppm of hydroquinone monomethyl ether are added as polymerization inhibitor. Then 12 g of glycidyl methacrylate and a suitable catalyst, e.g. a tertiary amine, are added and the mixture is held at 90° C. for a further six hours. The polymer thus prepared contains a terminal methacryloyl function capable of further polymerization. The molecular weight is 6000.

The macromonomers described in the table below were prepared analogously using glycidyl methacrylate.

| Macromonomer 2 | methyl methacrylate | MW about 2000 |
|---|---|---|
| Macromonomer 3 | styrene/acrylonitrile 3:1 | MW about 6000 |
| Macromonomer 4 | isobutyl acrylate | MW about 4500 |
| Macromonomer 5 | methyl methacrylate/hydroxyethyl methacrylate 4:1 | MW about 9000 |
| Macromonomer 6 | ethylhexyl methacrylate/hydroxyethyl methacrylate 6:1 | MW about 7000 |
| Macromonomer 7 | ethylhexyl acrylate | MW about 15,000 |
| Macromonomer 8 | butyl acrylate/stearyl methacrylate 1:1 | MW about 6000 |
| Macromonomer 9 | isobutyl methacrylate/cyclohexyl methacrylate 4:1 | MW about 4000 |
| Macromonomer 10 | n-butyl acrylate | MW about 6000 |
| Macromonomer 11 | ethylhexyl acrylate/butyl acrylate 1:1 | MW about 2500 |
| Macromonomer 12 | ethylhexyl acrylate/ethyl acrylate 9:1 | MW about 5500 |
| Macromonomer 13 | propyl methacrylate/octadecyl vinyl ether 9:1 | MW about 6000 |
| Macromonomer 14 | hydroxyethyl methacrylate/styrene 1:4 | MW about 3500 |
| Macromonomer 15 | butyl acrylate/ethylhexyl acrylate/triethylene glycol monomethacrylate 3:3:1 | MW about 4000 |
| Macromonomer 16 | propyl acrylate/ethylhexyl acrylate/perfluoroalkyl methacrylate 5:5:1 | MW about 4500 |
| Macromonomer 17 | ethyl acrylate/butyl vinyl ether 1:4 | MW about 1000 |

The methacryloyl-functional polydimethylsiloxane is prepared by transesterifying a monohydroxy-functional polydimethylsiloxane with methyl acrylate in accordance with known techniques.

| Macromonomer 18 | polydimethylsiloxane | MW about 5000 |
|---|---|---|
| Macromonomer 19 | polydimethylsiloxane | MW about 20,000 |
| Macromonomer 20 | polydimethylsiloxane | MW about 30,000 |

B) General Preparation of the Polymers of the Invention

Example 1

A glass flask provided with stirrer, thermometer, distillation attachment, dropping funnel and nitrogen inlet pipe is charged with 3.9 g of a macromonomer (macromonomer 12, see examples) consisting of a poly(2-ethylhexyl acrylate-ethyl acrylate) having a terminal methacryloyl group, molecular weight 5500, and 86.7 g of toluene. Throughout the reaction, nitrogen is passed over the mixture. After the reaction temperature has been raised to 90° C., a mixture of 0.92 g of AIBN, 119.6 g of 2-ethylhexyl acrylate and 6.5 g of benzyl methacrylate is metered in at a uniform rate over the course of 150 minutes. When the addition is finished, the reaction mixture is held at 90° C. for 120 minutes. After this time, the supply of nitrogen is stopped and the reaction temperature is raised to 150° C. with simultaneous application of vacuum (<25 mbar). Solvents, initiator decomposition products and monomer residues are distilled off until the amount of non-volatile components is >99%. A viscous polymer with a slight yellowish coloration is obtained in a yield of approximately 98%. The average molecular weight is determined as being approximately 15,700, by gel permeation chromatography using polystyrene as a comparison standard.

The following examples are prepared in analogy to Example 1.

| Ex. | Monomers | Initial weight of monomer (s) [g] | Macromonomer (s) | Initial weight of macromonomer (s) [g] | Temp. [° C.] | Nature and initial weight of initiator [g] | Nature and amount of solvent [g] | MW |
|---|---|---|---|---|---|---|---|---|
| 2 | IBA EHA | 85 198 | Macromonomer11 | 28 | 125 | 2.83 TrigC | 314 Xyl | 15,000 |
| 3 | BA | 120 | Macromonomer19 | 6 | 110 | 0.84 Luc | 84 Xyl | 18,500 |
| 4 | BA CHMA | 162 67.5 | Macromonomer15 | 40.5 | 125 | 1.89 TrigC | 407 BuAc | 32,000 |
| 5 | BHMA BA | 34 221 | Macromonomer1 | 85 | 130 | 3.4 TrigC | 630 Xyl | 21,000 |
| 6 | EHA | 369 | Macro- | 30.8 | 110 | 4.1 Luc | 136.7 BuAc | 25,600 |

-continued

| Ex. | Mono-mers | Initial weight of monomer(s) [g] | Macro-monomer(s) | Initial weight of macro-monomer(s) [g] | Temp. [°C] | Nature and initial weight of initiator [g] | Nature and amount of solvent [g] | MW |
|---|---|---|---|---|---|---|---|---|
| 7 | GMA<br>BA | 10.3<br>219.2 | monomer16<br>Macro-monomer12 | 4.5 | 110 | 1.46 Luc | 149.0 BuAc | 74,000 |
| 8 | BMA<br>ItmeE | 200<br>25 | Macro-monomer4 | 25 | 110 | 3.75 Luc | 167 Xyl | 11,000 |
| 9 | HEMA<br>BA<br>LMA | 10.5<br>44.1<br>9.8 | Macro-monomer17 | 5.6 | 130 | 0.49 TriC | 70 BuAc | 45,300 |
| 10 | BA | 90 | Macro-monomer10 | 10 | 110 | 1.0 Luc | 150 Xyl | 11,500 |
| 11 | Sty<br>EHMA | 5.5<br>71.5 | Macro-monomer20<br>Macro-monomer4 | 16.5<br>16.5 | 110 | 1.1 Luc | 257 BuAc | 17,800 |
| 12 | BA | 219.2 | Macro-monomer10 | 4.5 | 110 | 1.46 Luc | 149 BuAC | 89,000 |
| 13 | HPA<br>EHA<br>BA | 24.5<br>196<br>196 | Macro-monomer9<br>Macro-monomer19 | 49<br><br>24.5 | 130 | 4.9 TriC | 490 Xyl | 47,200 |
| 14 | LMA<br>BA<br>FMA | 16.2<br>54.9<br>2.7 | Macro-monomer4 | 36 | 113 | 1.08 T21S | 270 Xyl | 36,300 |
| 15 | EA<br>EHA | 22.7<br>97.3 | Macro-monomer10 | 2.5 | 110 | 0.81 Luc | 82 Xyl | 14,000 |
| 16 | TMA<br>LMA<br>BA | 11.5<br>34.5<br>167.9 | Macro-monomer3 | 16.1 | 130 | 1.96 TrigC | 153.3 BuAc | 24,600 |
| 17 | LMA<br>BA | 117.5<br>59.2 | Macro-monomer18 | 23.3 | 110 | 1.32 Luc | 134 Xyl | 40,000 |
| 18 | HA<br>BVE | 269.5<br>80.5 | Macro-monomer6 | 35 | 113 | 3.85 T21S | 525 Tol | 18,500 |
| 19 | HA<br>OVE | 125.8<br>17 | Macro-monomer2<br>Macro-monomer7 | 5.1<br>22.1 | 110 | 1.7 Luc | 315 BuAc | 49,500 |
| 20 | BA<br>EHA | 212.8<br>91.2 | Macro-monomer7 | 16.0 | 110 | 3.52 Luc | 137 MIBK | 22,700 |
| 21 | BA<br>Masr | 174.3<br>12.3 | Macro-monomer13 | 18.5 | 130 | 2.67 TrigC | 308 Xyl | 17,600 |
| 22 | EA<br>EHA | 35.1<br>150.7 | Macro-monomer19 | 14 | 110 | 1.32 Luc | 134 Xyl | 14,000 |
| 23 | αMsty<br>BA | 14.5<br>118.9 | Macro-monomer20 | 11.6 | 110 | 1.74 Luc | 145 Xyl | 22,000 |
| 24 | HMA<br>HBVE | 258<br>43 | Macro-monomer17 | 129 | 110 | 4.3 Luc | 1003 BuAc | 18,900 |

Key to Abbreviations and Trade Names

| | |
|---|---|
| EHA = | ethylhexyl acrylate |
| iBA = | isobutyl acrylate |
| BHMA = | behenyl methacrylate |
| BA = | n-butyl acrylate |
| CHMA = | cyclohexyl methacrylate |
| BeMA = | benzyl methacrylate |
| BMA = | n-butyl methacrylate |
| ItmeE = | dimethyl itaconate |
| HEMA = | hydroxyethyl methacrylate |
| LMA = | lauryl methacrylate |
| Masr = | methacrylic acid |
| GMA = | glycidyl methacrylate |
| EA = | ethyl acrylate |
| Sty = | styrene |
| αMsty = | α-methylstyrene |
| HPA = | hydroxypropyl acrylate |
| FMA = | Fluowet MA812, perfluoromethacrylate, Clariant GmbH, D-Frankfurt |
| TMA = | triethylene glycol methacrylate |
| HA = | hexyl acrylate |

-continued

| | |
|---|---|
| BVE = | butyl vinyl ether |
| OVE = | octadecyl vinyl ether |
| HMA = | hexyl methacrylate |
| HBVE = | hydroxybutyl vinyl ether |
| Luc = | Lucidol, Akzo Nobel NV, NL-Amersfoort, 75% dibenzoyl peroxide in water |
| TrigC = | Trigonox C, Akzo Nobel NV, NL-Amersfoort, tert-butyl peroxybenzoate |
| T21S = | Trigonox 21S, Akzo Nobel NV, NL-Amersfoort, tert-butylperoxy-2-ethylhexanoate |
| AIBN = | 2,2'-azobis (isobutyronitrile) |
| BuAc = | n-butyl acetate |
| Xyl = | xylene |
| Tol = | toluene |
| MIBK = | methyl isobutyl ketone |
| DBTL = | di-n-butyltin dilaurate. |

Although levelling agents having free hydroxyl groups are advantageous in respect of their ability to be incorporated into the binders by covalent bonding, it is known that under certain circumstances, where an additional coating is applied, they may lead to a deterioration in the intercoat adhesion. For this reason it may be sensible to block some or all of these hydroxyl groups by known techniques, such as by etherification or acetylation, for example.

Example 24

Acetylation of the Polymer of the Invention from Example 9

30 g of the polymer from Example 9 (hydroxyl number approximately 65) are charged to a four-necked flask with stirrer, thermometer, reflux condenser and nitrogen inlet pipe together with 4.6 g of acetic anhydride. Throughout the reaction, nitrogen is passed over the mixture. With stirring, the reaction temperature is raised to 75° C. and stirring is continued for two hours. After this time, free hydroxyl groups can no longer be detected in the IR spectrum. The nitrogen supply is stopped and the reaction temperature is raised to 150° C. with simultaneous application of vacuum (<25 mbar). Free acetic acid and excess acetic acid anhydride are distilled off until the amount of non-volatile components is >99%. A polymer with a slight yellow coloration is obtained.

Example 25

Reaction of the Polymer of the Invention from Example 9 with Isocyanates to Give Secondary Carbamates 30 g of the polymer from Example 9 (hydroxyl number approximately 65) and 30 g of butyl acetate are charged to a four-necked flask with stirrer, thermometer, reflux condenser, dripping funnel and nitrogen inlet pipe together with 0.03 g of a DBTL solution, 10% in xylene. Throughout the reaction, nitrogen is passed over the mixture. With stirring, the reaction temperature is raised to 60° C. and 4.4 g of hexyl isocyanate are metered in dropwise over the course of 10 minutes. An exothermic reaction ensues. After 90 minutes, isocyanate groups can no longer be detected in the IR spectrum. The nitrogen supply is stopped and the reaction temperature is raised to 150° C. with simultaneous application of vacuum (<25 mbar). Butyl acetate is distilled off until the amount of non-volatile components is >99%. A polymer with a slight yellow coloration is obtained.

Example 26

Reaction of the Polymer of the Invention from Example 9 with Maleic Anhydride to Give a Maleic Monoester 30 g of the polymer from Example 9 (hydroxyl number approximately 65) and 30 g of 1-methoxy-2-propyl acetate are admixed with 3.3 g of maleic anhydride in a four-necked flask with stirrer, thermometer, reflux condenser and nitrogen inlet pipe. Throughout the reaction, nitrogen is passed over the mixture. The mixture is heated with stirring to 60° C. and left under these conditions for three hours. After this time, anhydride bands can no longer be detected in the IR spectrum. A solution with a slight yellow coloration is obtained.

The performance of the polymers of the invention was tested by an application in a powder coating material and in a conventional solvent-borne coating material.

Preparation of a White Powder Coating Material

Composition:

| Uralac P5127 | 28.5% | polyester resin, DSM |
| DER 663 UE | 28.5% | epoxy resin, Dow |

-continued

| Kronos 2160 | 28.5% | titanium dioxide, Kronos |
| Blancfixe | 14.2% | barium sulphate, Sachtleben |
| Benzoin | 0.3% | DSM |
| Levelling agent | 0.1% or 0.15%, | see results table |

The levelling agents of the examples were incorporated as 10% masterbatches in Uralac P5127. This was taken into account for the initial weight of Uralac P5127.

All of the components were weighed in together and premixed in a high-speed mixer at 2000 rpm for 2.5 minutes. Thereafter the mixtures were extruded in a twin-screw extruder at 120° C. The resulting pieces were cooled, fractionated and ground in a pinned-disc mill. The resulting powder was passed through a 100 μm sieve.

The powder coating mixture produced in this way was then applied electrostatically on aluminium panels (size: 152 mm×76 mm, thickness 0.5 mm) and the metal panels thus coated were cured at 90° C. for 11 minutes.

Result:

| Film thickness: | 80–90 μm | 60–70 μm |
|---|---|---|
| Additive concentration: 0.15% | | |
| Acronal 4F | 3 | 3 |
| Example 12 | 1 | 2 |
| Example 10 | 1 | 2 |
| Example 3 | 1 | 1 |
| Additive concentration: 0.1% | | |
| Modaflow | 3 | 3 |
| Example 22 | 1 | 1 |
| Example 15 | 1 | 2 |

Acronal 4F = poly-n-butyl acrylate, BASF, Ludwigshafen
Modaflow = poly(ethyl acrylate/2-ethylhexyl acrylate), Monsanto
Evaluation of the resulting surfaces:
1 = crater-free surface
2 = surface with slight cratering
3 = surface with distinct cratering, in some cases down to the substrate Results for Solvent-Borne Acrylate/Melamine Baking Enamel Test System: Acrylate/Melamine Baking Enamel, Clear
Composition:

| Setalux 1760 VB 64 | 44.0% |
| Setalux C 91389 VX 45 | 16.5% |
| Luwipal 018 | 25.3% |
| butyl diglycol acetate | 2.1% |
| Solvesso 150 | 4.8% |
| butanol | 6.1% |
| butyl diglycol | 1.2% |
| mix, then add | |
| butanol | 8.0% |
| Solvesso 150 | 3.8% |
| butyl diglycol | 1.8% |

Setalux 1760 VB 64 = acrylate baking resin from Akzo Nobel Resins, Bergen op Zoom
Setalux C 91389 VX 45 = acrylate baking resin from Akzo Nobel Resins, Bergen op Zoom
Luwipal 018 = melamine baking resin, BASF AG, Ludwigshafen The levelling agents were incorporated one day before application. On the day of application, the viscosity was adjusted to 24 seconds, DIN 4 mm efflux cup, using Solvesso 150. Application was carried out by automatic spraying equipment.

After a flash-off time of 30 minutes, curing was effected at 140° C. in 30 minutes. The film thickness was 25 μm.

Visual Assessment of Levelling:

1=very good to 5=poor

Levelling Agent Amount Used Levelling

| Modaflow | 0.15% | 5 |
| Example 12 | 0.15% | 2 |
| Example 3 | 0.15% | 1 |
| Example 10 | 0.15% | 2 |

Modaflow = poly(ethyl acrylate-2-ethylhexyl acrylate), Monsanto

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A coating formulation comprising, at least one polymer resin and a leveling agent comprising a base molecule having attached macromonomeric units;

wherein the base molecule comprises monomeric units selected from the group consisting of:
alkenes and arylalkenes having from 2 to 30 carbon atoms;
acrylic acid, or methacrylic acid;
alkyl acrylates and alkyl methacrylates of straight-chain, branched or cycloaliphatic alcohols having from 1 to 22 carbon atoms;
aralkyl acrylates and aralkyl methacrylates of aralkyl alcohols having from 8 to 18 carbon atoms;
polyethylene glycol monoacrylates or polyethylene glycol methacrylates having from 5 to 80 carbon atoms;
hydroxyalkyl acrylates and hydroxyalkyl methacrylates of straight-chain, branched or cycloaliphatic diols having from 2 to 36 carbon atoms;
acrylamides and methacrylamides of straight-chain, branched or cycloaliphatic amines having from 1 to 22 carbon atoms;
maleates, itaconates and fumarates of straight-chain, branched or cycloaliphatic alcohols having from 1 to 22 carbon atoms;
perfluoroalkyl acrylates and perfluoroalkyl methacrylates having from 6 to 20 carbon atoms;
vinyl esters, vinyl ethers and vinyl ketones having from 3 to 20 carbon atoms;
caprolactone- or valerolactone-modified hydroxyalkyl acrylates, having an average molecular weight of from 220 to 1200; and
caprolactone- or valerolactone-modified hydroxyalkyl methacrylates having an average molecular weight of from 220 to 1200;

and the macromonomeric units have one ethylenically unsaturated bond;
and consist of polydimethylsiloxanes, or have the structure

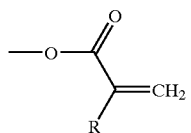

at a terminal end: wherein R is hydrogen or a methyl group; or monomeric units selected from the group consisting of
alkenes or arylalkenes having from 2 to 30 carbon atoms;
alkyl acrylates or alkyl methacrylates of straight-chain, branched or cycloaliphatic alcohols having from 1 to 22 carbon atoms;
aralkyl acrylates or aralkyl methacrylates of aralkyl alcohols having from 8 to 18 carbon atoms;
perfluoroalkyl acrylates or perfluoroalkyl methacrylates having from 6 to 20 carbon atoms;
vinyl esters, vinyl ethers or vinyl ketones having from 3 to 20 carbon atoms;
wherein the macromonomeric units have a weight-average molecular weight from 1000 to 30,000; and
wherein the macromonomeric units comprise from 1 to about 60% by weight, based on the total weight of the branched polymer, which has a weight-average molecular weight of from 5000 to 100,000; and
wherein the leveling agent concentration is from 0.01 to 5% by weight based on the total weight of the formulation.

2. The coating formulation according to claim 1, wherein the hydroxyalkyl acrylates and the hydroxyalkyl methacrylates comprise straight-chain, branched or cycloaliphatic diols having from 2 to 8 carbon atoms.

3. The coating formulation according to claim 1, wherein the base molecule comprises monomeric units selected from the group consisting of acrylic acid, methacrylic acid, methyl acrylate, methyl methacrylate, ethyl acrylate, ethyl methacrylate, n-butyl acrylate, n-butyl methacrylate, i-butyl acrylate, i-butyl methacrylate, t-butyl acrylate, t-butyl methacrylate, lauryl acrylate, lauryl methacrylate, 2-ethylhexyl acrylate, 2-ethylhexyl methacrylate, stearyl acrylate, stearyl methacxylate, behenyl acrylate, behenyl methacrylate, cyclohexyl acrylate, cyclohexyl methacrylate, isobornyl acrylate, isobornyl methacrylate, hydroxyethyl acrylate, hydroxyetbyl methacrylate, styrene, α-methylstyrene, acrylonitrile, triethylene glycol monoacrylate, triethylene glycol monomethacrylate, ethyl vinyl ether, butyl vinyl ether, cyclohexyl vinyl ether, vinyl acetate, polyethylene glycol monoacrylate, polyethylene glycol monomethacrylate, caprolactone- or valerolactone-modified hydroxyethyl acrylate having a molecular weight of between 220 and 1200 and caprolactone- or valerolactone-moditied hydroxyethyl methacrylate having a molecular weight of between 220 and 1200.

4. The coating formulation according to claim 1, wherein the macromonomeric units are polymers formed by free-radical or ionic addition polymerization.

5. The coating formulation according to claim 4, wrein the macromonomeric polymers comprise monomeric units selected from the group consisting of ethyl aerylate, ethyl methacrylate, n-butyl acrylate, n-butyl methacrylate, i-butyl acrylate, i-butyl methacrylate, t-butyl acrylate, t-butyl methacrylate, lauryl acrylate, lauryl methacrylate, stearyl acrylate, stearyl methacrylate, 2-ethylhexyl acrylate, 2-ethylhexyl methacrylate, behenyl acrylate, behenyl methacrylate, cyclohexyl acrylate, cyclohexyl methacrylate, isobornyl acrylate, isobornyl methacrylate, styrene, α-methylstyrene, acrylonitrile, ethyl vinyl ether, butyl vinyl ether, cyclohexyl vinyl ether and vinyl acetate.

6. The coating formulation according to claim 1, wherein the macromonomeric units comprise polydimethylsiloxanes.

7. The coating formulation according to claim 1, wherein the macromonomeric units comprise the structure

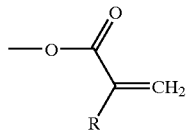

wherein R is hydrogen or a methyl group.

8. The coating formulation according to claim 1, wherein the weight fraction of the macromonomeric units is from 2 to 30 percent by weight, based on the total weight of the branched polymer.

9. The coating formulation according to claim 8, wherein the weight fraction of the macromonomeric units is from 2 to 15 percent by weight.

10. The coating formulation according to claim 1, wherein the macronionomeric units possess a weight-average molecular weight of from 5000 to 10,000.

11. The coating formulation according to claim 1, wherein the branched polymer possesses a weight-average molecular weight of from 10,000 to 75,000.

12. The coating formulation according to claim 1, wherein the branched polymer possesses a weight-average molecular weight of from 15,000 to 50,000.

13. The coating formulation according to claim 1, wherein the branched polymer further comprises functional hydroxyl groups esterified with at least one compound selected from the group consisting of maleic anhydride, succinic anhydride, phthalic anhydride, acrylic acid and methacrylic acid.

14. The coating formulation according to claim 1, wherein the leveling agent concentration is from 0.05 to 2% by weight.

15. The coating formulation according to claim 1, wherein the leveling agent concentration is from 0.1 to 1% by weight.

16. A method for preparing a coating formulation comprising, at least one polymer resin and a leveling agent, comprising mixing from 0.01 to 5% by weight of the leveling agent with the polymer resin; wherein the weight percent of the levelling agent is based on the total weight of the formulation;
wherein the leveling agent comprises a base molecule having attached macromonomeric units;
wherein the base molecule comprises monomeric units selected from the group consisting of:
alkenes and arylalkenes having from 2 to 30 carbon atoms; acrylic acid, or methacrylic acid;
alkyl acrylates and alkyl methacrylates of straight-chain, branched or cycloaliphatic alcohols having from 1 to 22 carbon atoms;
aralkyl acrylates and aralkyl methacrylates of aralkyl alcohols having from 8 to 18 carbon atoms;
polyethylene glycol monoacrylates or polyethylene glycol methacrylates having from 5 to 80 carbon atoms;
hydroxyalkyl acrylates and hydroxyalkyl metbacrylates of straight-chain, branched or cycloaliphatic diols having from 2 to 36 carbon atoms;
acrylamides and methactylamides of straight-chain, branched or cycloaliphatic amines having from 1 to 22 carbon atoms;
maleates, itaconates and fumarates of straight-chain, branched or cycloaliphatic alcohols having from 1 to 22 carbon atoms;
perfluroalkyl acrylates and perfluoroalkyl methacrylates having from 6 to 20 carbon atoms;
vinyl esters, vinyl ethers and vinyl ketones having from 3 to 20 carbon atoms;
caprolactone- or valerolactone-modified hydroxyalkyl acrylates, having an average molecular weight of from 220 to 1200; and
caprolactone- or valerolactone-modified hydroxyalkyl methacrylates having an average molecular weight of from 220 to 1200;
and the macromonomeric units have one ethylenically unsaturated bond;
and consist of polydimethylsiloxanes, or have the structure

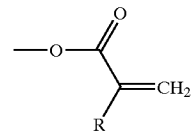

at a terminal end, wherein R is hydrogen or a methyl group; or monomeric units selected from the group consisting of
alkenes or arylalkenes having from 2 to 30 carbon atoms;
alkyl acrylates or alkyl methacrylates of straight-chain, branched or cycloaliphatic alcohols having from 1 to 22 carbon atoms;
aralkyl acrylates or aralkyl methacrylates of aralkyl alcohols having from 8 to 18 carbon atoms;
perfluoroalkyl acrylates or perfluoroalkyl methacrylates having from 6 to 20 carbon atoms;
vinyl esters, vinyl ethers or vinyl ketones having from 3 to 20 carbon atoms;
wherein the macromonomeric units have a weight-average molecular weight from 1000 to 30,000; and
wherein the macromonomeric units comprise from 1 to about 60% by weight, based on the total weight of the branched polymer, which has a weight-average molecular weight of from 5000 to 100,000.

17. The method of claim 16, wherein the leveling agent concentration is from 0.05 to 2% by weight.

18. The method of claim 17, wherein the leveling agent concentration is from 0.1 to 1% by weight.

* * * * *